United States Patent
Ueno et al.

(10) Patent No.: US 10,263,251 B2
(45) Date of Patent: Apr. 16, 2019

(54) BATTERY NEGATIVE ELECTRODE, BATTERY, AND MANUFACTURING METHOD OF BATTERY NEGATIVE ELECTRODE

(71) Applicants: Tomohiro Ueno, Muroran-shi, Hokkaido (JP); Kazuya Kubo, Muroran-shi, Hokkaido (JP); Hiroshi Kawano, Muroran-shi, Hokkaido (JP); Toshio Takahashi, Muroran-shi, Hokkaido (JP); EXERGY POWER SYSTEMS, INC., Bunkyo-ku, Tokyo (JP)

(72) Inventors: Tomohiro Ueno, Hokkaido (JP); Kazuya Kubo, Hokkaido (JP); Hiroshi Kawano, Hokkaido (JP); Toshio Takahashi, Hokkaido (JP); Kaduo Tsutsumi, Tokyo (JP)

(73) Assignees: THE JAPAN STEEL WORKS, LTD., Tokyo (JP); EXERGY POWER SYSTEMS, INC., Tokyo (JP)

( * ) Notice: Subject to any disclaimer, the term of this patent is extended or adjusted under 35 U.S.C. 154(b) by 73 days.

(21) Appl. No.: 15/459,871

(22) Filed: Mar. 15, 2017

(65) Prior Publication Data
US 2018/0026264 A1    Jan. 25, 2018

(30) Foreign Application Priority Data

Jul. 21, 2016  (JP) ................................. 2016-143223

(51) Int. Cl.
 H01M 4/00    (2006.01)
 H01M 4/38    (2006.01)
 B22F 9/04    (2006.01)
 C22C 19/03   (2006.01)
 C22F 1/10    (2006.01)
 (Continued)

(52) U.S. Cl.
 CPC ............... *H01M 4/383* (2013.01); *B22F 9/04* (2013.01); *C22C 19/03* (2013.01); *C22F 1/10* (2013.01); *H01M 4/0404* (2013.01); *H01M 4/52* (2013.01); *H01M 10/26* (2013.01); *H01M 10/345* (2013.01); *B22F 2301/15* (2013.01); *B22F 2304/10* (2013.01); *B22F 2998/10* (2013.01);
 (Continued)

(58) Field of Classification Search
 CPC . B22F 9/04; H01M 2220/10; H01M 2004/21; H01M 10/345; H01M 10/26; H01M 4/52; H01M 4/383; H01M 4/0404
 See application file for complete search history.

(56) References Cited

U.S. PATENT DOCUMENTS

| | | | |
|---|---|---|---|
| 4,324,845 A | 4/1982 | Stockel | |
| 2015/0243976 A1* | 8/2015 | Otsuki | C22C 19/03 428/687 |

FOREIGN PATENT DOCUMENTS

| | | |
|---|---|---|
| JP | 57049175 A | 3/1982 |
| JP | 60115151 A | 6/1985 |

(Continued)

*Primary Examiner* — Cynthia H Kelly
*Assistant Examiner* — Monique M Wills
(74) *Attorney, Agent, or Firm* — Holtz, Holtz & Volek PC

(57) ABSTRACT

A battery negative electrode includes a hydrogen storage alloy as a negative electrode active material, wherein the hydrogen storage alloy has a mean volume diameter within a range from 4 μm to 12 μm, and is disposed to be capable of being in contact with hydrogen in a hydrogen containing part in which hydrogen is contained.

12 Claims, 4 Drawing Sheets

(51) Int. Cl.
  *H01M 4/04*   (2006.01)
  *H01M 4/52*   (2010.01)
  *H01M 10/26*  (2006.01)
  *H01M 10/34*  (2006.01)
  *H01M 4/02*   (2006.01)

(52) U.S. Cl.
  CPC .. *H01M 2004/021* (2013.01); *H01M 2220/10* (2013.01); *H01M 2300/0014* (2013.01)

(56) References Cited

FOREIGN PATENT DOCUMENTS

| | | |
|---|---|---|
| JP | 07153484 A | 6/1995 |
| JP | 2013020955 A | 1/2013 |

\* cited by examiner

BATTERY NEGATIVE ELECTRODE, BATTERY, AND MANUFACTURING METHOD OF BATTERY NEGATIVE ELECTRODE The present U. S. patent application claims a priority under the Paris Convention of Japanese patent application No. 2016-143223 filed on Jul. 21, 2016, the entirety of which is incorporated herein by references.

BACKGROUND OF THE INVENTION

Field of the Invention

The present invention relates to a negative electrode for a battery using consumption and discharge reaction of hydrogen, and a battery using the negative electrode.

Description of the Related Art

In recent years, large-sized stationary batteries are in high demand for emergency power sources and the like. Secondary batteries that can supply power with high capacity include a lead storage battery, a nickel hydrogen battery and a lithium ion battery. To make these batteries large-sized involves problems regarding the weight, costs, safety and the like.

The nickel hydrogen battery among those is a battery in which a hydrogen storage alloy is used for the negative electrode and nickel hydroxide is used for the positive electrode, and is lighter in weight than the lead battery. Moreover, it is more excellent in safety than the lithium ion battery because it uses aqueous electrolyte. It should be noted that the hydrogen storage alloy for the negative electrode is expensive and the upsizing leads to increase of costs and weight correspondingly, which causes a bottleneck in the production of nickel hydrogen batteries with high capacity.

Now, Japanese Patent Laid-Open No. s57-49175, Japanese Patent Laid-Open No. s60-115151 and Japanese Patent Laid-Open No. H7-153484 propose batteries in which nickel hydroxide is used for the positive electrode and a known fuel cell hydrogen electrode is used for the negative electrode. Hydrogen as a negative electrode active material is stored in the gas state in the battery, which aims for limited use such as artificial satellite use. With such a battery, gaseous hydrogen is used as the active material, and the weight of the negative electrode can be reduced. Nevertheless, expensive platinum fine particles are used as a catalyst in the negative electrode, which makes radical reduction of costs difficult.

Moreover, Japanese Patent Laid-Open No. 2013-20955 proposes a battery (nickel hydrogen gas battery) in which a hydrogen storage alloy is used for the negative electrode and hydrogen as the active material is stored in the gas state in a battery container. In this battery, on the hydrogen storage alloy during discharge, two reactions of absorption of the hydrogen gas and discharge simultaneously proceed.

SUMMARY OF THE INVENTION

Although in the nickel hydrogen gas battery as mentioned above, the hydrogen storage alloy of the negative electrode is needed to conduct absorption of hydrogen and discharge together at high rates for improving its performance, specific measures therefor or expected performance has not been investigated.

The present invention is devised in view of the aforementioned circumstances, relates to a battery using consumption of hydrogen and discharge reaction with the hydrogen storage alloy, and focuses on a particle diameter of the hydrogen storage alloy used for a negative electrode. An object thereof is to provide a battery negative electrode capable of attaining excellent performance by properly setting the particle diameter, a battery, and a manufacturing method of the battery negative electrode.

To achieve at least one of the above-mentioned objects, according to an aspect, a battery negative electrode includes the hydrogen storage alloy as a negative electrode active material, wherein the hydrogen storage alloy has a mean volume diameter within a range from 4 μm to 12 μm, and is disposed to be capable of being in contact with hydrogen in a hydrogen containing part in which hydrogen is contained.

In the above-mentioned battery negative electrode, it is preferred that the hydrogen storage alloy discharges while consuming the hydrogen during discharge.

In the above-mentioned battery negative electrode, it is preferred that the hydrogen storage alloy is used in contact with an electrolyte.

In the above-mentioned battery negative electrode, it is preferred to comprise the hydrogen containing part.

In the above-mentioned battery negative electrode, it is preferred to further comprise a hydrogen moving channel in which hydrogen moves from the hydrogen containing part to enable the hydrogen to be in contact with the battery negative electrode.

To achieve at least one of the above-mentioned objects, according to an aspect, a battery comprises the battery negative electrode according to any one of aspects; and a positive electrode having nickel hydroxide.

In the above-mentioned battery, it is preferred to further comprise: an electrolyte; and a separator, wherein the electrolyte is disposed between the battery negative electrode and the positive electrode, and the separator is disposed in the electrolyte at a position where it separates the battery negative electrode from the positive electrode.

In the above-mentioned battery, it is preferred to comprise the hydrogen containing part according to first aspect of the negative electrode, wherein the hydrogen containing part is disposed such that the battery negative electrode is enabled to be in contact with hydrogen on an opposite face to a face, of the battery negative electrode, on which the battery negative electrode is in contact with the electrolyte.

In the above-mentioned battery, it is preferred to further comprise a hydrogen moving channel in which hydrogen moves between the hydrogen containing part and the battery negative electrode to enable the hydrogen to be in contact with the battery negative electrode.

To achieve at least one of the above-mentioned objects, according to an aspect, a manufacturing method of a battery negative electrode comprises: manufacturing a hydrogen storage alloy fine powder by crushing a hydrogen storage alloy to have a mean volume diameter within a range from 4 μm to 12 μm; removing a surface layer containing an oxide coating film by performing a surface treatment on the hydrogen storage alloy fine powder; and supporting, as a negative electrode active material, the hydrogen storage alloy fine powder after the surface treatment on a supporting body to dispose it capable of being in contact with hydrogen.

In the above-mentioned manufacturing method, it is preferred that the surface treatment is performed by bringing the hydrogen storage alloy fine powder into contact with a heated alkaline aqueous solution or a heated acidic aqueous solution.

In the above-mentioned manufacturing method, it is preferred that the contact is performed while stirring the solution.

Hereafter, the mean volume diameter of the hydrogen storage alloy defined by the present invention is described.

By making the particle diameter of the hydrogen storage alloy small, the surface area thereof, that is, an area contributing the reaction can be increased. Therefore, the smaller particle diameter is more advantageous. Nevertheless, a process of making metal into fine powder costs higher as the particles become finer. Moreover, during the process of making fine powder, the surface thereof tends to catch impurities such as oxide. Furthermore, when the fine powder is used as the negative electrode of the hydrogen gas battery, contact resistance in the fine powder becomes large, which possibly causes output deterioration of the battery. Therefore, it is desirable that the lower limit of the mean volume diameter of the hydrogen storage alloy be 4 μm and the upper limit thereof be 12 μm.

Furthermore, by performing an appropriate surface treatment on the fine powder in order to remove oxide caught on the surface during the process of making the fine powder, the performance of the fine powder by nature can be attained more.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Figure 1:
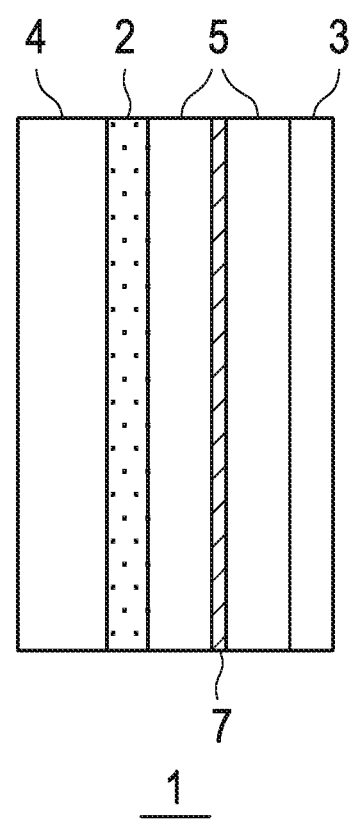
FIG. 1 is a schematic diagram showing a battery using a negative electrode of an embodiment of the present invention.

Hereafter, embodiments of the present invention are described with reference to the appended drawings.

As a material used for the negative electrode, a hydrogen storage alloy having 4 μm or more and 12 μm or less of mean volume diameter is prepared.

In the present invention, a type of the hydrogen storage alloy is not specially limited, but for the hydrogen storage alloy, $AB_5$-type alloy, $AB_2$-type alloy, $A_2B_7$-type alloy or the like can be used. Each hydrogen storage alloy can be manufactured by an atomizing method using arc melting or the like or the similar method. It can be classified into a predetermined particle diameter by mechanical crushing, a sieve and the like to be used. In the present invention, an adjusting method of the particle diameter is not limited to a specific method.

The mean volume diameter is represented by an average diameter obtained by weighting in volume.

Furthermore, as a surface treatment method of fine powder, an alkali treatment of stirring in a strong alkali solution for removing surface oxide, an acid treatment of stirring in a weak acid solution such as acetic acid as well as in a strong acidic aqueous solution such as aqueous hydrogen fluoride, or the similar treatment can be used.

The aforementioned hydrogen storage alloy can afford a negative electrode material mixture by being mixed with a conductive assistant and a binder. As the conductive assistant, carbon powder or the like can be used. For this powder, for example, approximately nanometer-sized powder can be used. Moreover, as the binder, CMC (carboxymethyl cellulose), PTFE (polytetrafluoroethylene) and the like can be used.

A mixing ratio of the aforementioned hydrogen storage alloy, conductive assistant and binder is not specially limited but, for example, the mixing can be performed in a ratio of 1:0.05:0.004:0.01 of alloy powder:CMC:PTFE:carbon powder.

In the present invention, types of the conductive assistant and the binder are not specially limited.

The aforementioned hydrogen storage alloy powder or mixture is caused to stick onto porous nickel by a proper method such as application. In the present invention, the method of sticking is not specially limited but the mixture only has to be securely supported on porous nickel. The porous nickel corresponds to a supporting body.

A manufacturing method, shape and the like of porous nickel are not specially limited. Moreover, other than porous nickel, punching metal, expanded metal or the like can be used as a collector.

While an assembly of porous nickel onto which the mixture sticks can be used as it is, it can be formed to have a proper thickness by processing such as rolling.

Meanwhile, the material of the positive electrode is not specifically limited but, for example, nickel hydroxide can be used. Nickel hydroxide is formed to have 10 μm of average particle diameter, and caused to stick onto porous nickel. It can be molded by drying and rolling. For the electrolyte, an aqueous solution of potassium hydroxide or alkali mainly containing potassium hydroxide can be used.

A negative electrode 2 obtained as above is incorporated and used in a battery 1. FIG. 1 shows an embodiment of a battery cell having a gaseous hydrogen containing chamber 4.

In the battery cell, the gaseous hydrogen containing chamber 4 is provided on the rear face side of a negative electrode 2. Gaseous hydrogen in the gaseous hydrogen containing chamber 4 can be absorbed and released into/from hydrogen storage alloy particles of the negative electrode 2, and a discharge reaction accompanies the absorption and releasing. The gaseous hydrogen containing chamber 4 corresponds to a hydrogen containing part of the present invention.

Between the negative electrode 2 and a positive electrode 3, a separator 7 composed of non-woven fabric and the like is disposed. The positive electrode 3, the negative electrode 2 and the separator 7 are immersed in an electrolyte 5, and thereby, electricity is secured to pass through those.

The material of the positive electrode 3 is not specially limited, but therefor, nickel hydroxide can be used. Nickel hydroxide is made into powder and supported on porous nickel, followed by rolling, heating and drying to make the positive electrode 3. For the electrolyte 5, for example, an alkaline aqueous solution of KOH or KOH as its main component can be used.

Figure 2:
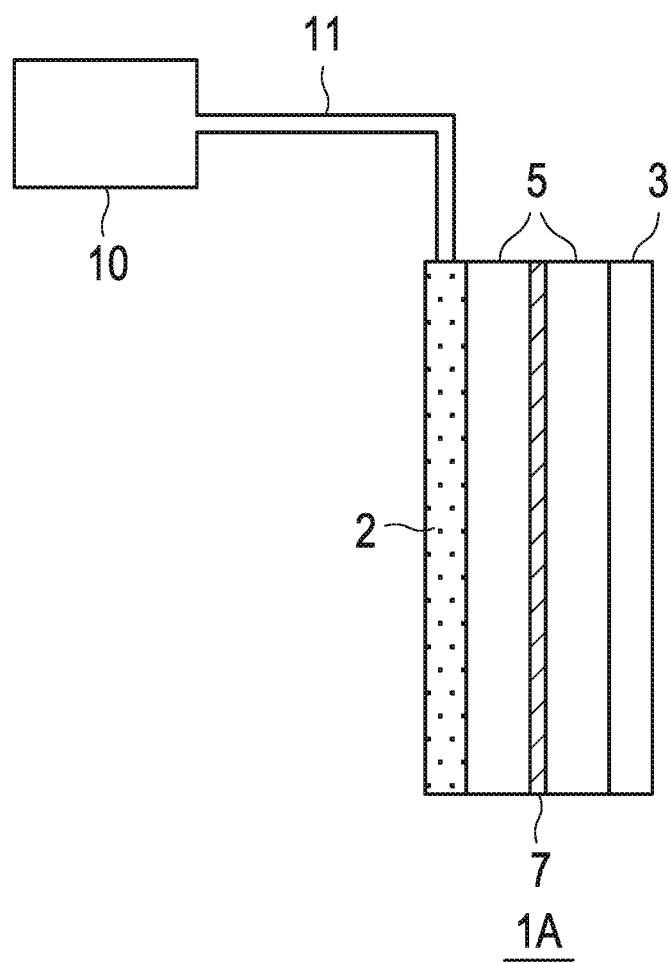
FIG. 2 is a schematic diagram showing a battery using a negative electrode of another embodiment of the present invention.

FIG. 2 shows a battery 1A of another embodiment. Notably, the configuration similar to that of the aforementioned embodiment is given the same sign and its description is omitted or simplified.

In this embodiment, the battery cell itself does not have a gaseous hydrogen containing chamber. A gaseous hydrogen moving channel 11 is connected to the negative electrode 2 so that the negative electrode 2 can be brought into contact with gaseous hydrogen. The gaseous hydrogen moving channel 11 is connected to a gaseous hydrogen containing chamber 10. The gaseous hydrogen containing chamber 10 corresponds to the hydrogen containing part of the present invention.

Also in this embodiment, gaseous hydrogen moving through the gaseous hydrogen containing chamber 10 and the gaseous hydrogen moving channel 11 is absorbed and released into/from hydrogen storage alloy particles of the negative electrode 2, which causes a discharge reaction to function as the battery 1A.

As described above, according to these embodiments, reactivity of the hydrogen storage alloy of the negative electrode can be enhanced. By increasing the surface area of the hydrogen storage alloy by being made into fine powder, a reaction area for both the absorption reaction and the discharge reaction of hydrogen gas can be improved. Furthermore, the particle diameter of the hydrogen storage alloy is determined based on both an advantage of improving the reactivity and disadvantages of costs, surface poisoning and output deterioration.

Example 1

Hereafter, an example of the present invention is described.

The positive electrode and the negative electrode produced by the aforementioned technique of the embodiments are built in an airtight container in the state where they are insulated by a separator, between them, composed of materials such as PP (polypropylene) non-woven fabric, followed by charge discharge tests. While the airtight container is filled with hydrogen gas, as needed, to this, a container storing hydrogen gas can be attached.

As an $AB_5$ hydrogen storage alloy for the negative electrode, hydrogen storage alloy with an atomic mass ratio of Mm1.0 Ni3.55 Mn0.4 Co0.75 Al0.3 was produced by arc melting under an argon atmosphere. The theoretical capacity of this alloy is 280 mAh/g. This was treated under heating, and after that, crushed into 5 μm of mean volume diameter (MV). This hydrogen storage alloy fine powder was mixed with CMC (carboxymethyl cellulose), PTFE (polytetrafluoroethylene), and nanometer-sized carbon powder that enhances conductivity in the powder of the hydrogen storage alloy, forming slurry. That is, CMC (carboxymethyl cellulose) as a thickener in 0.38 wt %, PTFE (polytetrafluoroethylene) as a binder in 5 wt %, and carbon powder with nanometers of particle diameter as a conductive assistant in 1 wt % were mixed. This slurry was applied on foamed nickel to be rolled, affording the negative electrode. Its size was 25 mm×25 mm×0.20 mm and its capacity was approximately 100 mAh.

Meanwhile, for the positive electrode, $Ni(OH)_2$ powder with 11 μm of average particle diameter was mixed with CMC (carboxymethyl cellulose) in 0.16 wt % and PTFE in 5 wt %. A positive electrode active material thus obtained was applied on a porous nickel support, followed by rolling and drying to afford the positive electrode of the example of the present invention.

For the electrolyte, KOH, NaOH and LiOH were mixed in 3:3:0.4 of molar ratio, affording a solution totally in 6.4 normal to be used. The electrodes produced by the aforementioned techniques were built in an electrochemical cell such that the capacities of the negative electrode and the positive electrode were in approximately 3:1. Moreover, between the positive electrode and the negative electrode, the separator composed of polypropylene non-woven fabric with approximately 0.2 mm of thickness was disposed to prevent short circuit. Furthermore, the electrochemical cell was built in a pressure container with approximately 170 cc of volume, a charge discharge test being performed under a hydrogen pressure with 0.9 MPaG of maximum pressure.

When a discharge test was performed using such a cell, the internal pressure of the pressure container linearly decreased during discharge, a discharge capacity exceeding the negative electrode capacity was shown. This cause is that the negative electrode consumed gaseous hydrogen and discharged. The decrease rate of the internal pressure can be represented as a current value from the following discharge reaction of hydrogen ($H_2+2HO^- \rightarrow 2H_2O+2e^-$).

This is defined as a hydrogen gas consumption current and compared with a discharge current. Thereby, reactivity of the negative electrode with hydrogen gas can be evaluated.

Figure 3:
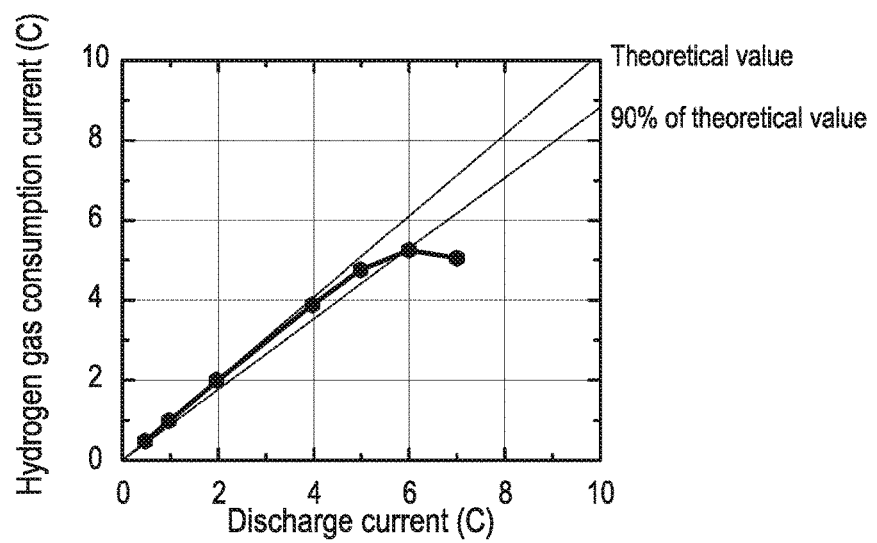
FIG. 3 is a diagram showing relation, in an example of the present invention, between a discharge current and a hydrogen gas consumption current with a cell using the negative electrode.

FIG. 3 shows relation between the discharge current and the hydrogen gas consumption current calculated from the decrease rate of the internal pressure.

Notably, in FIG. 3, each of the discharge current and the hydrogen gas consumption current is defined as a value which is normalized by the theoretical capacity of the hydrogen storage alloy (discharge rate: C). In FIG. 3, the hydrogen gas consumption current shows the theoretical value when the discharge rate is low, and the hydrogen gas consumption rate shows a value smaller than the theoretical value as the discharge current becomes larger. This is because the reaction rate of the hydrogen storage alloy of the negative electrode with hydrogen gas cannot follow the discharge current, and hydrogen in the hydrogen storage alloy is also used for the discharge. For estimating performance of the negative electrode, a current at which the hydrogen gas consumption current decreases down to 90% of theoretical value (90% following current) is read to be approximately 5 C.

Figure 4:
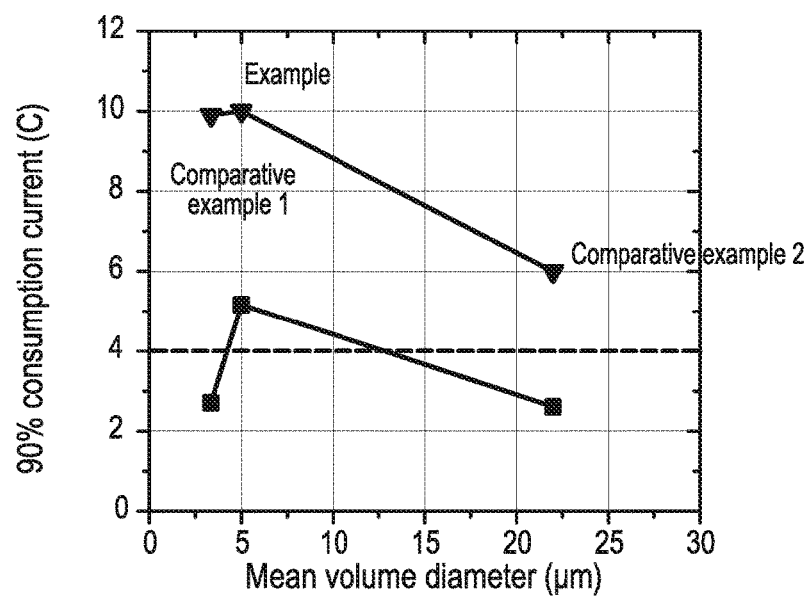
FIG. 4 is a diagram showing relation between a 90% hydrogen gas consumption current and a mean volume diameter of the hydrogen storage alloy in the example of the present invention, Comparative Example 1 and Comparative Example 2.

As comparative examples, 90% following currents were measured for negative electrodes using $AB_5$ alloy particles with 3.3 μm of mean volume diameter (Comparative Example 1) and 22 μm thereof (Comparative Example 2). As shown in FIG. 4 (lower line in the figure), it is found that the following current of the example of the present invention (EXAMPLE) is at its maximum. Furthermore, from FIG. 4, it is estimated that the particle diameter with which the 90% following current is 4 C or more to the negative electrode area is 4 μm to 12 μm.

With the negative electrode within this particle diameter range, the hydrogen gas reaction can follow the discharge even at 1 C to the positive electrode when the negative electrode and the positive electrode are built in the battery in 1:4 of capacity ratio between them. Furthermore, it can follow the discharge even at 2 C to the positive electrode when the capacity ratio between the negative electrode and the positive electrode is 1:2. The above shows that the negative electrode capacity can be reduced to ¼ to ½ of that of the positive electrode, which enables lower costs relative to those for a conventional nickel hydrogen battery in which the negative electrode capacity is larger than the positive electrode capacity.

Furthermore, FIG. 4 (upper line in the figure) also shows 90% following currents with negative electrodes that underwent a treatment of stirring them for 1 hour in a potassium hydroxide solution with 6 M of concentration heated at 90° C. as the surface treatment before mixing the alloy fine powder with the binder and the like. For all the negative electrodes with the given particle diameters, the 90% following currents largely increase. It is understood that the surface treatment improves the cleanness of the surface due to removal of oxide thereon, and accordingly, improves the reactivity thereon with hydrogen gas.

It is read from FIG. 4 that the 90% following current is 8 C or more to the negative electrode area by using fine powder which has undergone the surface treatment and has 4 µm to 12 µm of particle diameter. The hydrogen gas reaction can follow the discharge even at 1 C to the positive electrode when the negative electrode and the positive electrode are built in the battery in 1:8 of capacity ratio between them. Furthermore, it can follow the discharge even at 4 C to the positive electrode when the negative electrode and the positive electrode are built in the battery in 1:2 of capacity ratio between them. The above shows that the negative electrode capacity can be reduced to $\frac{1}{8}$ to $\frac{1}{4}$ of that of the positive electrode, and the amount of loading on the negative electrode can be further reduced than in the case of using the powder without the treatment. Use of fine powder within this particle diameter range can attain the performance balancing deterioration in yield during the process of the surface treatment and increased costs due to the surface treatment itself.

As above, the present invention has been described based on the aforementioned embodiments and example. The scope of the present invention is not limited to the contents of the aforementioned description but modifications proper to the aforementioned embodiments can occur without departing from the scope of the present invention.

What is claimed is:

1. A battery negative electrode comprising a hydrogen storage alloy as a negative electrode active material, wherein the hydrogen storage alloy has a mean volume diameter within a range from 4 µm to 12 µm.

2. The battery negative electrode according to claim 1, wherein the hydrogen storage alloy is configured to discharge while consuming hydrogen during discharge.

3. The battery negative electrode according to claim 1, wherein the hydrogen storage alloy is configured to be used in contact with an electrolyte.

4. The battery negative electrode according to claim 1, further comprising a hydrogen containing part.

5. The battery negative electrode according to claim 4, further comprising a hydrogen moving channel in which hydrogen moves from the hydrogen containing part to enable the hydrogen to be in contact with the negative electrode active material.

6. A battery comprising:

the battery negative electrode according to claim 1; and a positive electrode comprising nickel hydroxide.

7. The battery according to claim 6, further comprising:

an electrolyte; and a separator, wherein:

the electrolyte is disposed between the battery negative electrode and the positive electrode, and the separator is disposed in the electrolyte at a position where it separates the battery negative electrode from the positive electrode.

8. The battery according to claim 7, further comprising:

a hydrogen containing part, wherein the hydrogen containing part is disposed such that the battery negative electrode is enabled to be in contact with hydrogen on an opposite face to a face of the battery negative electrode on which the battery negative electrode is in contact with the electrolyte.

9. The battery according to claim 8, further comprising a hydrogen moving channel in which the hydrogen moves between the hydrogen containing part and the battery negative electrode to enable the hydrogen to be in contact with the battery negative electrode.

10. A manufacturing method of a battery negative electrode, the method comprising:

manufacturing a hydrogen storage alloy fine powder by crushing a hydrogen storage alloy to have a mean volume diameter within a range from 4 µm to 12 µm;

removing a surface layer containing an oxide coating film by performing a surface treatment on the hydrogen storage alloy fine powder; and supporting, as a negative electrode active material, the hydrogen storage alloy fine powder after the surface treatment on a supporting body.

11. The method according to claim 10, wherein the surface treatment is performed by bringing the hydrogen storage alloy fine powder into contact with a heated alkaline aqueous solution or a heated acidic aqueous solution.

12. The method according to claim 11, wherein the contact is performed while stirring the solution.

* * * * *